United States Patent
Yu

(10) Patent No.: US 8,428,922 B2
(45) Date of Patent: Apr. 23, 2013

(54) FINITE DIFFERENCE LEVEL SET PROJECTION METHOD ON MULTI-STAGED QUADRILATERAL GRIDS

(75) Inventor: Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 12/701,114

(22) Filed: Feb. 5, 2010

(65) Prior Publication Data

US 2011/0196656 A1   Aug. 11, 2011

(51) Int. Cl.
  *G06G 7/50*  (2006.01)
(52) U.S. Cl.
  USPC ................................. 703/9; 703/2; 702/100
(58) Field of Classification Search .................. 703/7, 9, 703/2; 702/2, 100, 6
  See application file for complete search history.

(56) References Cited

U.S. PATENT DOCUMENTS

| | | | |
|---|---|---|---|
| 4,797,842 A | 1/1989 | Nackman et al. | |
| 5,459,498 A | 10/1995 | Seccombe et al. | |
| 5,657,061 A | 8/1997 | Seccombe et al. | |
| 5,989,445 A | 11/1999 | Wise et al. | |
| 6,064,810 A * | 5/2000 | Raad et al. | 703/2 |
| 6,161,057 A | 12/2000 | Nakano | |
| 6,179,402 B1 | 1/2001 | Suzuki et al. | |
| 6,257,143 B1 | 7/2001 | Iwasaki et al. | |
| 6,283,568 B1 | 9/2001 | Horii et al. | |
| 6,315,381 B1 | 11/2001 | Wade et al. | |
| 6,322,186 B1 | 11/2001 | Shimizu et al. | |
| 6,322,193 B1 | 11/2001 | Lian et al. | |
| 6,453,275 B1 * | 9/2002 | Schoenmaker et al. | 703/2 |
| 7,117,138 B2 | 10/2006 | Yu et al. | |
| 7,536,285 B2 * | 5/2009 | Yu | 703/2 |
| 7,921,001 B2 * | 4/2011 | Yu | 703/9 |
| 7,930,155 B2 * | 4/2011 | Zhang et al. | 703/9 |
| 2002/0046014 A1 | 4/2002 | Kennon | |
| 2002/0107676 A1 | 8/2002 | Davidson | |
| 2002/0177986 A1 | 11/2002 | Moeckel et al. | |
| 2003/0105614 A1 | 6/2003 | Langemyr et al. | |
| 2004/0006450 A1 | 1/2004 | Hale | |
| 2004/0034514 A1 | 2/2004 | Langemyr et al. | |
| 2005/0114104 A1 | 5/2005 | Friedl et al. | |
| 2007/0239413 A1 * | 10/2007 | Yu | 703/9 |
| 2009/0281776 A1 * | 11/2009 | Cheng et al. | 703/2 |

OTHER PUBLICATIONS

Bell, J., et al., "Projection Method for Viscous Incompressible Flow on Quadrilateral Grids", AIAA Journal, vol. 32, No. 10, Oct. 1994, pp. 1961-1969.

Bell, J., et al., "A Second-Order Projection Method for the Incompressible Navier-Stokes Equations", Journal of Computational Physics, vol. 85, No. 2, Dec. 1989, pp. 257-283.

Chopp, D.,"Computing Minimal Surfaces via Level Set Curvature Flow", Mathematics Department, University of California, Berkeley, California, Journal of Computational Physics 106, pp. 77-91, 1993.

(Continued)

*Primary Examiner* — Eunhee Kim

(57) ABSTRACT

A finite difference level set projection algorithm on multi-staged quadrilateral grids for simulation of a split liquid film between two rollers. From one stage to the next, the number of meshes in the vertical direction changes by a select factor to provide a good balance between resolution and number of meshes. Having fewer meshes at the nip (the smallest gap between the rollers), the multi-staged quadrilateral grid allows a much bigger time step and requires much less CPU time to reach the steady state.

18 Claims, 10 Drawing Sheets

OTHER PUBLICATIONS

Osher, Stanley, et al., "Fronts Propagating with Curvature-Dependent Speed: Algorithms Based on Hamilton-Jacobi Formulations", Department of Mathematics, University of California, Los Angeles and, Department of Mathematics, University of California, Berkeley, California, Journal of Computational Physics 79, pp. 12-49, 1988.

Sussman, M., et al., "A Level Set Approach for Computing Solutions to Incompressible Two-Phase Flow", Department of Mathematics, University of California, Los Angeles, California, Journal of Computational Physics 114, pp. 146-159, 1994.

Trebotich, D., et al., "A Projection Method for Incompressible Viscous Flow on Moving Quadrilateral Grids", Department of Mechanical Engineering, University of California, Berkeley, California and Applied Numerical Algorithms Group, Lawrence Berkeley National Laboratory, Berkeley, California, Journal of Computational Physics 166, pp. 191-217, 2001.

Bell, J., et al., "A Second-Order Projection Method for Variable-Density Flows", Lawrence Livermore National Laboratory, Livermore, California, Journal of Computational Physics 101, pp. 334-348, 1992.

Almgren, A. S., et al., "A Conservative Adaptive Projection Method for the Variable Density Incompressible Navier-Stokes Equations", Lawrence Berkeley National Laboratory, pp. 1-52, 1999.

* cited by examiner

FINITE DIFFERENCE LEVEL SET PROJECTION METHOD ON MULTI-STAGED QUADRILATERAL GRIDS

CROSS-REFERENCE TO RELATED APPLICATION(S)

This application is related to U.S. Pat. No. 7,117,138, entitled "Coupled Quadrilateral Grid Level Set Scheme for Piezoelectric Ink-Jet Simulation," the content of which patent is incorporated by reference herein in its entirety.

BACKGROUND

1. Field of Invention

The present application is directed towards systems and methods for simulating an environment using multi-staged grids.

2. Description of Related Art

Numerical methods are often used to design and predict a variety of mechanical systems. An example of such a system may include a liquid film between two moving rollers as shown in FIG. 1. This liquid film may be a lubricant or part of a printing process. An interface forms between the liquid film and the ambient environment, such as air. The shape of the interface is of interest to designers of the system. The shape of interface is dependent on the velocity of the rollers, the shape of the rollers, the physical properties of the liquid and the environment.

The designers of the system may simulate the behavior of the fluid by dividing up a simulation space between the rollers with a quadrilateral grid. Prior art methods that have been used to divide up the simulation space have had the same number of cells in the vertical direction throughout the simulation space. As shown in FIG. 1 the opening of the simulation domain is wider than the nip of the simulation domain.

As shown in FIG. 1 while the nip of the simulation space is more than adequately described using 6 cells, the opening and the midpoint of the simulation space is not adequately described using 6 cells. FIG. 2 is an illustration of a simulation space similar to FIG. 1 in which 16 cells are uniformly distributed along the vertical direction. In FIG. 2, the opening and the midpoint of the simulation space are more than adequately described using 16 cells, while an excessive amount of resources are used to describe the nip of the simulation space.

The present invention is a system and method to simulate a simulation space such as the one shown in FIG. 1 while effectively using the computational resources available, and still maintaining the advantages of a quadrilateral grid.

SUMMARY OF INVENTION

An embodiment of the present invention may be a system or method for simulating a physical process in a simulation space to determine system variables that characterize the physical process. The method may be carried out in response to instructions executed by a processor of the system or other processor-controlled device. The instructions may be embodied on a computer-readable medium.

The simulation may include dividing the simulation space into a plurality of quadrilateral grids, which may include a first grid that has a first number of meshes along a vertical axis of the simulation space. The plurality of quadrilateral grids may also include a second grid that is adjacent to the first grid and that has twice the first number of meshes along the vertical axis of the simulation space as the first grid.

The simulation may include identifying a first cell and a fourth cell in the first grid, and identifying a second cell, a third cell, a fifth cell and a sixth cell in the second grid. A first node may be located at an intersection of the first, third, fourth and fifth cell.

The first cell may include a first edge that coincides with a second edge of the second cell and a third edge of the third cell. The fourth cell may include a fourth edge that coincides with a fifth edge of the fifth cell and a sixth edge of the sixth cell.

The simulation may include evaluating, using a finite element projection, a system variable associated with the first node using a testing function and an interpolation function. The testing function extends through a first area encompassing the first, second, third, fourth, fifth, and sixth cell. The interpolation function extends through a second area encompassing the first, third, fourth and fifth cell.

An embodiment of the present invention may also include a method for simulating a system variable in a simulation space that includes a method for evaluating a system variable at a second node located at the intersection of the first edge and a seventh edge. The second cell and the third cell may share the seventh edge.

The system variable may be evaluated at a third point located at a cell center of the first cell. The system variable may also be evaluated at a fourth point located at a cell center of the second cell. The system variable may also be evaluated at a fifth point located at a cell center of the third cell.

Evaluating the system variable may include evaluating a Jacobian located at a center of the seventh edge as the sum of a Jacobian located at the fourth point and a Jacobian located at the fifth point.

In an embodiment of the present invention the system variable may be selected from the group consisting of: a velocity of a fluid; a velocity of the fluid in a horizontal direction; a velocity of a fluid in a vertical direction; a level set function representative of a signed distance to an interface; and a pressure of the fluid.

In an embodiment of the present invention evaluating the system variable may include evaluating a plurality of governing equations that represent the behavior of a fluid. In an embodiment of the present invention evaluating the plurality of governing equations includes finding a steady state solution to the governing equations.

In an embodiment of the present invention the plurality of governing equations represent the behavior of a first fluid bounded by a first surface, a second surface, and an interface between the first fluid and a second fluid. In an embodiment of the present invention the first fluid is oil and the second fluid is air.

An embodiment of the present invention in which the first surface is in motion. An embodiment of the present invention in which the second surface is in motion. An embodiment of the present invention in which the first surface has a first radius and the second surface has a second radius.

An embodiment of the present invention may be a system including a processor for performing a method for evaluating a system variable.

Other objects and attainments together with a fuller understanding of the invention will become apparent and appreciated by referring to the following description and claims taken in conjunction with the accompanying drawings.

BRIEF DESCRIPTION OF DRAWINGS

In the drawings wherein like reference symbols refer to like parts.

DESCRIPTION OF THE PREFERRED EMBODIMENTS

Figure 1:
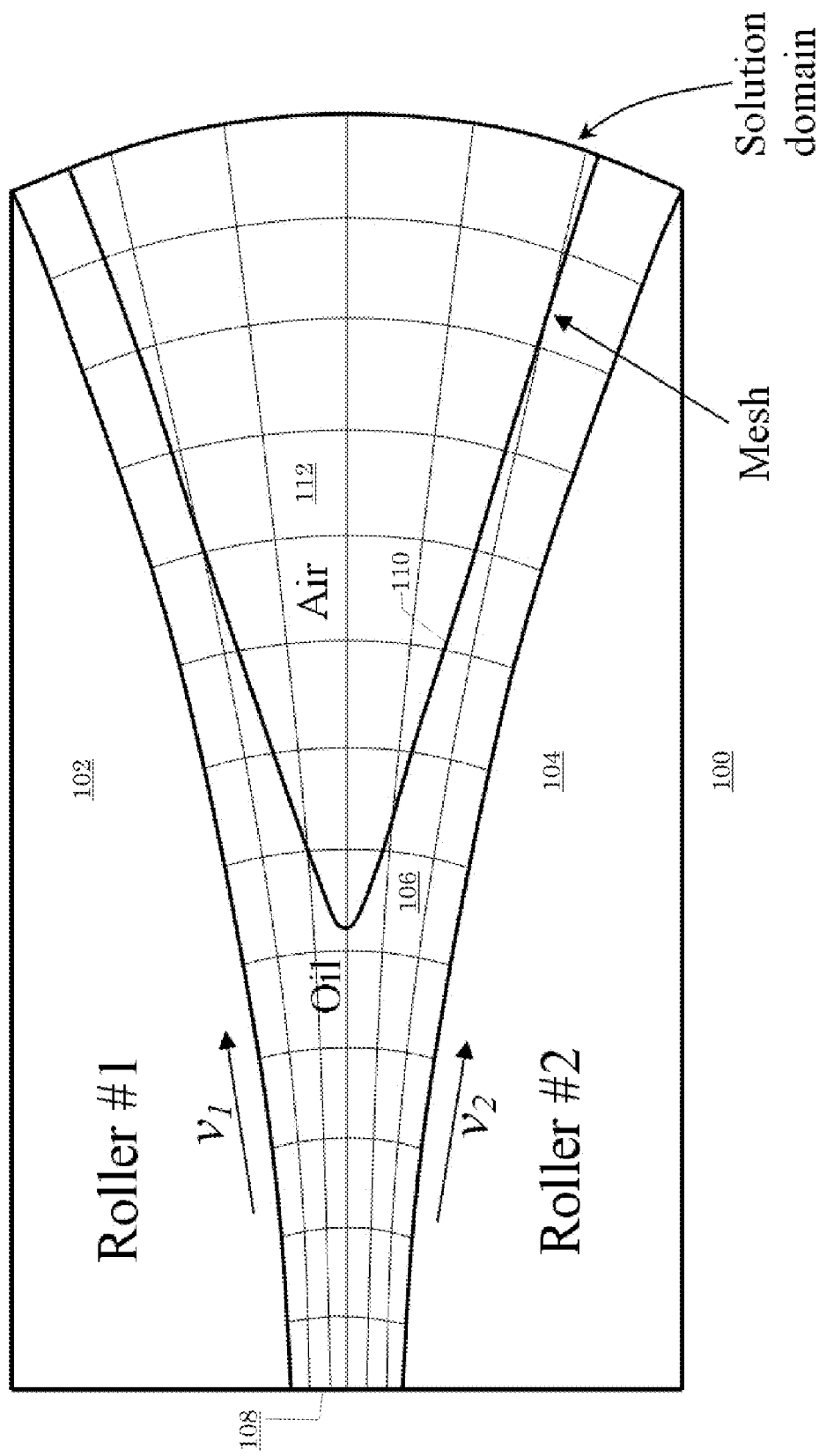
FIG. 1 is an illustration a system that an embodiment of the present invention may be used to simulate including a mesh that prior art methods use.

FIG. 1 is an illustration of a system 100 that an embodiment of the present invention may be used to simulate. The system 100 may include a pair of rollers 102 and 104. Roller 1 may be moving at speed $v_1$ and roller may be moving at a speed $v_2$. A first fluid 106 may be situated between roller 102 and roller 104. The first fluid may be oil. The smallest gap between the rollers 102 and 104 may be identified as the nip 108. An interface 110 may exist between the first fluid 106 and a second fluid 112. The radii of rollers 102 and 104 may be different. The two rolling velocities $v_1$ and $v_2$ may also be different. The purpose of the simulation may be to understand the steady shape (if it exists) of the interface 110 for given roller radii, surface tension coefficient, and other physical constants. FIG. 1 also shows a possible quadrilateral mesh for the simulation.

An embodiment of the present invention may include a finite difference level set projection method using multi-staged quadrilateral grids. An embodiment of the present invention may be used to represent a liquid film between a pair of rollers, and to simulate the behavior of the liquid film. The simulation space in which the liquid film is being simulated may be divided into a plurality of stages. The number of meshes in the vertical direction may change by a factor of 2 from a first stage to a second.

In the context of the present invention the terms mesh(es), cell(s), grid(s), and stage(s) are used to describe the discretization of a computational space. The terms grid and stage are used to describe a discrete set of nodes which are used to represent a portion of the computational space. The terms meshes and cells refer to a discrete set of nodes in the grid or stage (i.e., 4 for a quadrilateral grid) which are used to represent a more limited portion of the computational space.

Compared with a typical quadrilateral grid, the multi-staged quadrilateral grid allows a good balance between resolution and resources. Since the multi-staged grid has fewer meshes at the nip of the liquid film, it allows for a larger time step and requires less time to reach a steady equilibrium state.

FIG. 1 shows the basic configuration of the simulation problem, which includes a pair of rollers at speeds $v_1$ and $v_2$, respectively, a certain liquid (usually oil) coming from the nip (which is the location with the smallest gap between the two rollers), and the free interface between the liquid and air. The radii of the two rollers may be different. The two rolling velocities may also be different. The purpose of the simulation is to understand the steady shape (if exists) of the split liquid film for given roller radii, $v_1$, $v_2$, surface tension coefficient, and other physical constants. FIG. 1 also shows a possible quadrilateral mesh for the simulation.

One can apply the simulation technology disclosed in U.S. Pat. No. 7,117,138 to the split liquid film simulation. In a typical simulation, the nip gap, two roller radii, two rolling velocities (constant in time), material properties (including fluid viscosities, densities, surface tension), inflow velocity (constant in time) at nip, and an arbitrary initial split liquid film shape are given. The simulation may be kept running for a long period of time until a steady state solution is found.

Figure 2:
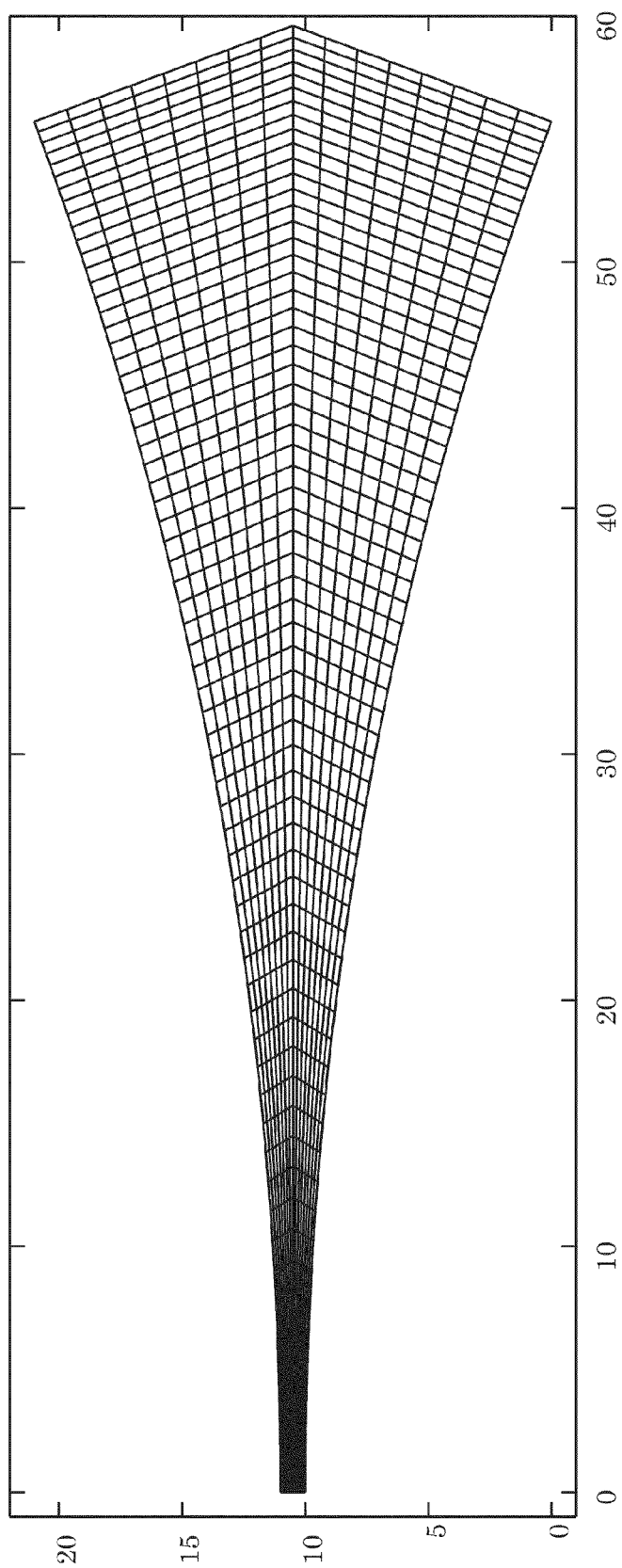
FIG. 2 is an illustration of the physical solution domain covered by a typical quadrilateral grid as used in the prior art.

However, a performance issue comes up when the prior art method is used. FIG. 2 is an illustration of the physical solution domain covered by a typical quadrilateral grid. The typical quadrilateral grid has the same number of meshes (16 meshes) in the vertical direction at the left hand side (nip) and at the right hand side (opening). Since the right hand side of the solution domain is much wider than the nip, it requires a larger number of meshes in the vertical direction to maintain an accurate mesh resolution. However, the same large number of meshes at the nip results in a smaller mesh size. As shown in FIG. 2 the grid lines are tightly packed at the nip region.

The time step of a simulation method may be constrained by the square of the smallest mesh size. Thus, a simulation method that uses a typical quadrilateral grid as used in the prior art requires a smaller time step, in which case, a greater amount of computation time is required to reach a steady state solution.

Figure 3:
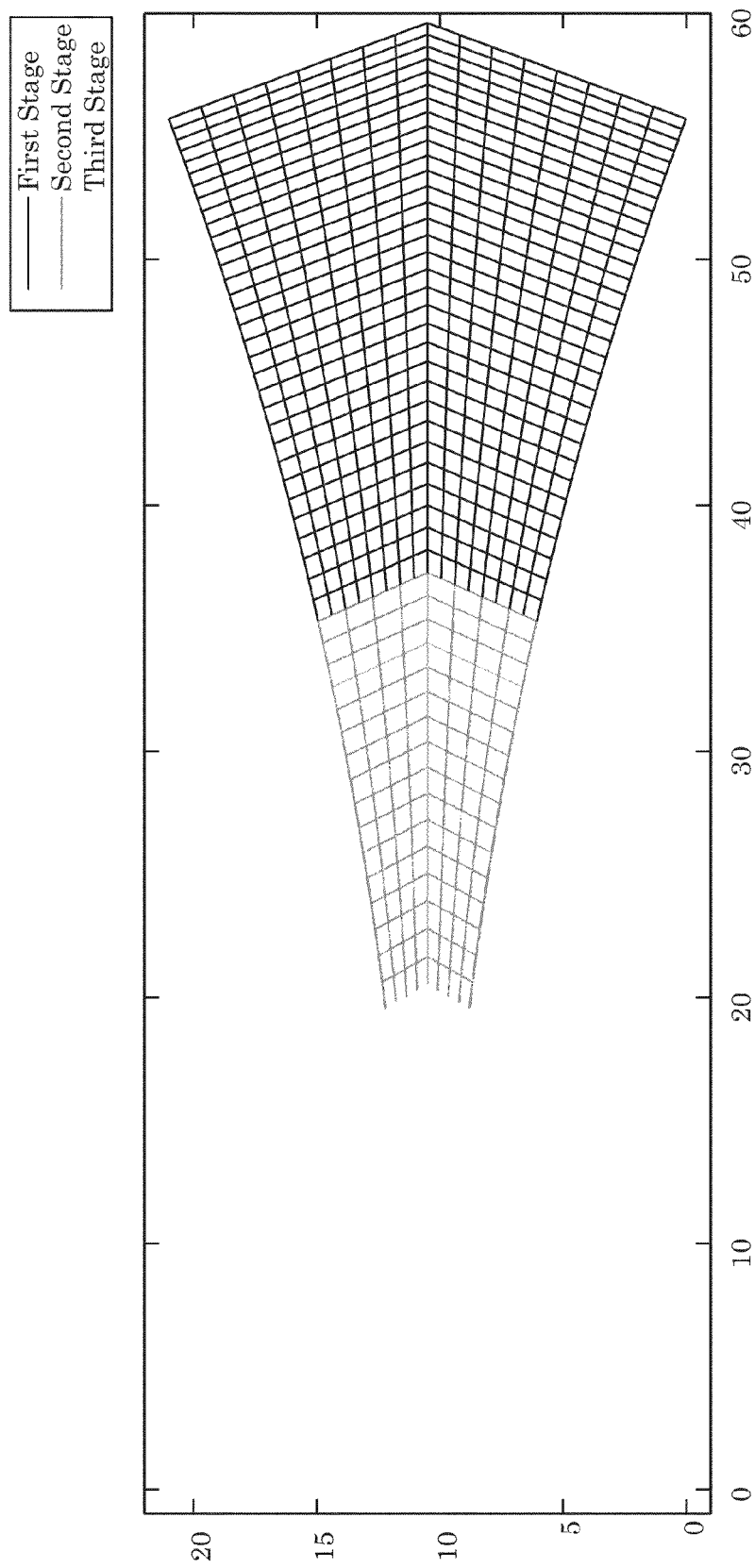
FIG. 3 is an illustration of a three-stage quadrilateral grid as may be used by an embodiment of the present invention.

An embodiment of the present invention is a finite difference level set projection algorithm on multi-staged quadrilateral grids. FIG. 3 shows a three-stage quadrilateral grid for a split liquid film simulation between two rollers. The black lines illustrate 16 meshes in the vertical direction. The dark gray lines illustrate 8 meshes in the vertical direction. The light gray lines illustrate 4 meshes in the vertical direction. As shown in FIG. 3 at each stage-to-stage boundary a rougher mesh is divided into two finer meshes. In this way, if the left hand side has "meshy" meshes in the vertical direction, the right hand side will have "$2^{n-1} \times$meshy" meshes in the vertical direction, where n is the number of stages. Compared with the typical quadrilateral grid (or single stage quadrilateral grid), the multi-staged quadrilateral grid allows a good balance between resolution and number of meshes. Since the multi-staged grid has fewer meshes at the nip, it allows a much bigger time step and needs a much shorter CPU time to the steady state.

An embodiment of the present invention may include special procedures for representing the spatial discretization of the simulation at the boundary where the two stages meet. An embodiment of the present invention may also include a finite element projection, in which case special procedures at the boundary where two stages meet will need special procedures.

It is noted that, although a three-staged quadrilateral grid is plotted, and at each stage-to-stage boundary the rougher mesh is divided into two finer meshes, the proposed algorithm works for any number of stages and the rougher mesh can be divided into any number of finer meshes at the stage-to-stage boundary.

Equations of Motion

Both fluid #1 and fluid #2 are governed by the incompressible Navier-Stokes equations, equations (1) and (2)

$$\rho_1 \frac{D\vec{u}_1}{Dt} = -\nabla p_1 + \nabla \cdot (2\mu_1 D_1) \quad (1)$$

$$\nabla \cdot \vec{u}_1 = 0$$

-continued $$\rho_2 \frac{D\vec{u}_2}{Dt} = -\nabla p_2 + \nabla \cdot (2\mu_2 D_2) \quad (2)$$

$$\nabla \cdot \vec{u}_2 = 0$$

Equation (3) describes some of the terms used in equations (1) and (2)

$$D_i = \frac{1}{2}\left[\nabla \vec{u}_i + (\nabla \vec{u}_i)^T\right] \quad i = 1, 2 \quad (3)$$

$$\vec{u}_i = u_i(x, y)\hat{e}_x + v_i(x, y)\hat{e}_y \quad i = 1, 2$$

The matrix $D_i$ is the rate of deformation tensor and the vector $\vec{u}$ is the $$\frac{D\vec{u}_i}{Dt} = \left(\frac{\partial}{\partial t} + (\vec{u}_i \cdot \nabla)\right)\vec{u}_i$$

fluid velocity. The following definitions are also used: is the material derivate; $p_i \equiv p_i(x,y)$ is the pressure; $\rho_i$ is the density; and $\mu_i$ is the dynamic viscosity. The subscript i=1, 2 is used to denote that the variable or constant is in fluid #1 or fluid #2. The gravity term is omitted in the above equations. The inclusion of a gravity term does not change any part of the numerical schemes described in the next sections. An individual skilled in the art will appreciate how to adapt the present invention to include the effect of gravity.

The boundary conditions at the interface of the two phases are the continuity of the velocity and the jump condition represented by equation (4).

$$(2\mu_1 D_1 - 2\mu_2 D_2) \cdot \hat{n} = (p_i - p_2 + \sigma\kappa)\hat{n} \quad (4)$$

As used in the present disclosure n is the unit normal to the interface drawn from fluid #2 to fluid #1 and κ is the curvature of the interface.

The level set method may be used to describe the interface. The interface is the zero level of the level set function φ. The level set function φ(x,y) is chosen such that is less than (greater than) 0 if (x,y) is in fluid #2 (fluid #1). The level set function φ also vanishes at the interface, and is initialized as the signed distance to the interface. The unit normal at the interface can be expressed in terms of φ by $$\hat{n} = \left.\frac{\nabla\phi}{|\nabla\phi|}\right|_{\phi=0}$$

and the curvature of the interface may be described as $$\kappa = \left.\nabla \cdot \left(\frac{\nabla\phi}{|\nabla\phi|}\right)\right|_{\phi=0}.$$

The following definitions may be used to simplify the presentation of the governing equations: $\vec{u}=\vec{u}_1$; $p=p_1$; and $D=D_1$ for φ>0, and $\vec{u}=\vec{u}_2$; $p=p_2$; and $D=D_2$ for φ<0. The governing equations for the two-phase flow and the boundary condition at the interface can then be re-written as equations (5) and (6).

$$\nabla \cdot \vec{u} = 0 \quad (5)$$

$$\rho(\phi)\frac{D\vec{u}}{Dt} = -\nabla p + \nabla \cdot (2\mu(\phi)D) - \sigma\kappa(\phi)\delta(\phi)\nabla\phi \quad (6)$$

In which the symbol δ is the Dirac delta function and ρ and μ are taken as $\rho_1$ ($\rho_2$), $\mu_1$ ($\mu_2$) for φ≧0 (φ<0). The fact that the surface tension can be written as a body force concentrated at the interface greatly reduces the difficulty involved in solving two-phase fluid flows.

To make the governing equations dimensionless, the following definitions described in equation (7) can be used.

$$x = Lx', \quad y = Ly', \quad t = \frac{\rho_1 L^2}{\mu}t', \quad (7)$$

$$p = \frac{\mu U}{L}p', \quad \vec{u} = U\vec{u}',$$

$$\rho = \rho_1 \rho', \quad \mu = \mu_1 \mu',$$

In which the primed quantities are dimensionless and L is the characteristic length, U is the characteristic velocity, $\rho_1$ is the density of fluid #1, and $\mu_i$ is the dynamic viscosity of fluid #1.

Substituting equation (7) into equations (5) and (6), and dropping the primes, yields equations (8) and (9).

$$\nabla \cdot \vec{u} = 0 \quad (8)$$

$$\frac{\partial \vec{u}}{\partial t} = Re(\vec{u} \cdot \nabla)\vec{u} = -\frac{\nabla p}{\rho(\phi)} + \frac{\nabla \cdot (2\mu(\phi)D)}{\rho(\phi)} - \frac{\kappa(\phi)\delta(\phi)\nabla\phi}{\rho(\phi)Ca} \quad (9)$$

In which the density ratio ρ, the viscosity ratio μ, the Reynolds number Re, and the Capillary number Ca are defined in equation (10).

$$\rho(\phi) = \begin{cases} 1 & \text{if } \phi \geq 0 \\ \rho_2/\rho_1 & \text{if } \phi < 0 \end{cases} \quad (10)$$

$$\mu(\phi) = \begin{cases} 1 & \text{if } \phi \geq 0 \\ \mu_2/\mu_1 & \text{if } \phi < 0 \end{cases}$$

$$Re = \frac{\rho_1 UL}{\mu_1}$$

$$Ca = \frac{\mu_1 U}{\sigma}$$

Since the interface moves with the fluid, the evolution of the level set is governed by a level set evolution equation such as the one described in equation (11).

$$\frac{\partial \phi}{\partial t} = \vec{u} \cdot \nabla \phi = 0 \tag{11}$$

The form of the level set evolution equation has been chosen based on the motion of the interface with respect to the motion of the fluid.

Since equations (8), (9), and (11) are expressed in terms of the vector notation, they assume the same form in Cartesian coordinates, axi-symmetric coordinates and other coordinate systems.

Boundary Conditions and Contact Models

On solid walls, it is assumed that both the normal and tangential components of the velocity vanish, except at the triple point at which the interface between the fluid #1 and fluid #2 meet the solid walls, where a slippery contact line model as set forth in U.S. Pat. No. 7,085,695, the content of which is incorporated by reference herein, should be employed. At both inflow and outflow, the present formulation allows one to prescribe either the velocity such as described by equation (120)

$$\vec{u} = \vec{u}^{BC} \tag{12}$$

or the boundary conditions may be described in terms of the pressure using equations (13).

$$p = p^{BC} \tag{13}$$
$$\frac{\partial \vec{u}}{\partial \hat{n}} = 0$$

In the case of equation (13) û denotes the unit normal to the inflow or outflow boundary.

Governing Equations on Quadrilateral Mesh

An embodiment of the present invention may use a finite difference analysis in reasonably complex geometries, for which a rectangular grid may not work well. Thus governing equations may be described in terms of a general quadrilateral grid formulation. This can be done by transforming the viscosity, surface tension, and viscoelastic stress terms.

Figure 4:
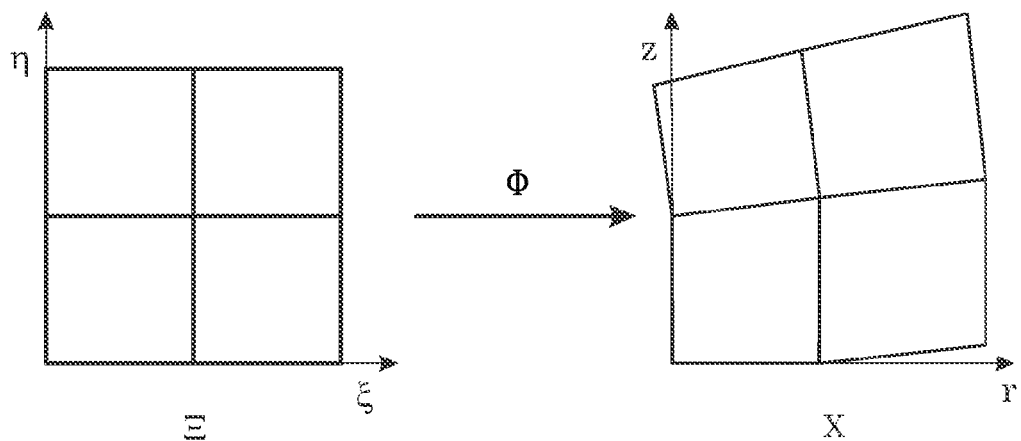
FIG. 4 is an illustration of a transformation which maps grid points between a computational space and a physical space.

Suppose a transformation $\Phi$ which maps the grid points of a rectangular mesh in a computational space $\Xi=(\xi, \eta)$ to those of a quadrilateral mesh in the physical space $X=(x,y)$ as shown in FIG. 4 and described in equation (14).

$$X = \phi(\Xi) \tag{14}$$

The Jacobian J and the transformation matrix T are defined in equations (15).

$$J = \det \nabla_\Xi \Phi = \det \begin{pmatrix} x_\xi & x_\eta \\ y_\xi & y_\eta \end{pmatrix} \tag{15}$$

$$T = J[\nabla_\Xi \Phi]^{-1} = \begin{pmatrix} y_\eta & -x_\eta \\ -y_\xi & x_\xi \end{pmatrix}$$

The transformed convection velocity vector is described by equation (16).

$$\vec{\bar{u}} = T\vec{u} \tag{16}$$

The governing equations on the quadrilateral grid are described in equation (17).

$$\frac{\partial \vec{u}}{\partial t} + \frac{Re}{J}(\vec{\bar{u}} \cdot \nabla_\Xi)\vec{u} = -\frac{1}{\rho(\phi)J}T^T\nabla_\Xi p + \text{(viscosity term)} - \tag{17}$$

$$\frac{\delta(\phi)}{J^2 \rho(\phi)Ca}\nabla_\Xi \cdot \left\{ T\frac{T^T\nabla_\Xi \phi}{|T^T\nabla_\Xi \phi|} \right\}(T^T\nabla_\Xi \phi)$$

$$\nabla_\Xi \cdot \vec{\bar{u}} = 0$$

$$\frac{\partial \phi}{\partial t} + \frac{\vec{\bar{u}} \cdot \nabla_\Xi \phi}{J} = 0$$

In which the viscosity term is defined in equation (18).

$$\text{viscosity term: } \frac{1}{\rho(\phi)Re}\nabla \cdot [2\mu(\phi)D] = \tag{18}$$

$$\frac{1}{J\rho(\phi)Re}[T^T\nabla_\Xi \mu(\phi)] \cdot \left[ \frac{T^T\nabla_\Xi \vec{u}}{J} + \left(\frac{T^T\nabla_\Xi \vec{u}}{J}\right)^T \right] +$$

$$\frac{\mu(\phi)}{J\rho(\phi)Re}\nabla_\Xi \cdot \left[ \frac{TT^T\nabla_\Xi \vec{u}}{J} \right]$$

Note that $\nabla_\Xi$ and $\nabla_\Xi \bullet$ are "matrix operators" while $\nabla$ and $\nabla \bullet$ are vector operators. When a vector operator is put in front of a vector quantity, it not only "operates" on the magnitude of the vector quantity but also on the direction. Here, the matrix operators $\nabla_\Xi$ and $\nabla_\Xi \bullet$ are applied to scalars or matrices, and hence the "direction" is not relevant.

Temporal Discretization

In the following discussion the superscript n (or n+1) is in reference to a time step such as the one described in equation (19).

$$\vec{u}^n = \vec{u}(t=n\Delta t) \tag{19}$$

Given quantities $\vec{u}^n$, $p^{n-1/2}$, and $\phi^n$, the purpose of an embodiment of the present invention may be to obtain $\vec{u}^{n+1}$, $p^{n+1/2}$, and $\phi^{n+1}$. The semi-implicit algorithm described is second-order accurate in both time and space.

The boundary conditions on the solid wall stems may be dependent upon a contact model. The inflow pressure at $t^{n+1}$ may be based upon an electrical circuit. Since the temporal discretization remains the same no matter what coordinate system or grids are used, the governing equations in vector notation, i.e. (8), (9), and (11), to explain the temporal discretization are used. How to evaluate the individual terms on quadrilateral grids will be explained later.

Level Set Update

Temporal discretization of the level set evolution equation gives us equation (20).

$$\phi^{n+1} = \phi^n - \Delta t[\vec{u} \cdot \nabla \phi]^{n+1/2} \tag{20}$$

The time-centered advection term $[\vec{u} \cdot \nabla \phi]^{n+1/2}$ may be evaluated using an explicit predictor-corrector scheme that requires only the available data at $t^n$. Once the new level set value $\phi^{n+1}$ is obtained, the level set value at the half time+step $\phi^{n+1/2}$ may be estimated using equation (21).

$$\phi^{n+1/2} = \frac{1}{2}(\phi^n + \phi^{n+1}) \quad (21)$$

Semi-Implicit Time Integration for Momentum Equations

In an embodiment of the present invention a semi-implicit temporal scheme such as the one described in equation (22) is used.

$$\vec{u}^* = \vec{u}^n + \Delta t \left\{ -Re\left[(\vec{u} \cdot \nabla)\vec{u}\right]^{n+1/2} - \frac{\nabla p^{n-1/2} + \nabla \cdot [\mu(\phi^{n+1/2})(D^n + D^*)]}{\rho(\phi^{n+1/2})} - \frac{[\kappa(\phi)\delta(\phi)\nabla\phi]^{n+1/2}}{\rho(\phi^{n+1/2})Ca} \right\} \quad (22)$$

In which a rate of deformation predictor D* is defined in equation (23).

$$D^* = \frac{1}{2}\left[\nabla \vec{u}^* + \left(\nabla \vec{u}^*\right)^T\right] \quad (23)$$

Then, deduct the pressure contribution to obtain the velocity predictor as described in equation (24).

$$\vec{u}^* \leftarrow \vec{u}^* + \frac{\Delta t}{\rho(\phi^{n+1/2})} \nabla p^{n-1/2} \quad (24)$$

Finally solve the following projection equation by enforcing the incompressibility condition at $t^{n+1}$ using equation (25) as is described below.

$$\vec{u}^{n+1} = \vec{u}^* - \frac{\Delta t}{\rho(\phi^{n+1/2})} \nabla p^{n+1/2} \quad (25)$$

In equation (22) a second-order explicit Godunov method for the advection term is applied and the central difference scheme is used for the viscosity term and surface tension term.

Finite Element Projection for $\vec{u}^{n+1}$

To satisfy the incompressibility condition for time step n+1, apply the divergence operator on both sides of equation (25), since $\nabla \cdot \vec{u}^{n+1} = 0$ this gives us equation (26).

$$\nabla \cdot \vec{u}^* = \nabla \cdot \left(\frac{\Delta t}{\rho(\phi^{n+1/2})} \nabla p^{n+1/2}\right) \quad (26)$$

After the pressure $p^{n+1/2}$ is solved using equation (26), the velocity field $\vec{u}^{n+1}$ can be obtained using equation (25).

To simplify the implementation for arbitrary geometries, use a finite element projection of the form described in equation (27).

$$\int_\Omega \vec{u}^* \cdot \nabla \psi dx = \int_\Omega \frac{\Delta t}{\rho(\phi^{n+1/2})} \nabla p^{n+1/2} \cdot \nabla \psi dx + \oint_{\Gamma_1} \psi \vec{u}^{BC} \cdot \hat{n} dS \quad (27)$$

In which ψ is the finite element testing (or weighting) function, $\Gamma_1$ denotes the inflow and outflow boundaries, and $\vec{u}^{BC}$ is the velocity boundary condition (if any). In an embodiment of the present invention the vector field $\vec{u}^{BC}$ may be function of space and time, or may be held constant across, space, time or both. By applying the divergence theorem to equation (27), one can verify that such equation implies that the boundary conditions at $\Gamma_1$ are as set forth in equation (28).

$$\frac{\Delta t}{\rho(\phi^{n+1/2})} \frac{\partial p^{n+1/2}}{\partial \hat{n}}\bigg|_{\Gamma_1} = (\vec{u}^* - \vec{u}^{BC}) \cdot \hat{n}\bigg|_{\Gamma_1} \quad (28)$$

The choice of the weighting function, as well as the approximation for the pressure and velocity, is flexible. In an embodiment of the present invention an approximation of the weighting function and the pressure may be piecewise bilinear, and an approximation of the velocity maybe piecewise constant. An individual skilled in the art will appreciate how to adapt the present invention such that higher order approximations may be used for the weighting function, the pressure, and the velocity may be used without going beyond the scope and spirit of the present invention.

Re-Initialization of the Level Set

To correctly capture the interface and accurately calculate the surface tension, the level set function should remain a signed distance function to the interface as the calculations unfold. However, if the level set is updated using the level set evolution function (11), it will not remain so for long. Instead, the simulation is periodically stopped and a new level set function φ is recreated which is the signed distance function, $|\nabla \phi|=1$, without changing the zero level set of the original level set function. Several good choices of re-initialization algorithm can be found in the prior art and have been discussed in U.S. Pat. No. 7,254,523, and US Patent Publication No. 2007-0239413 which are hereby incorporated by reference.

Spatial Discretization

Figure 5A:
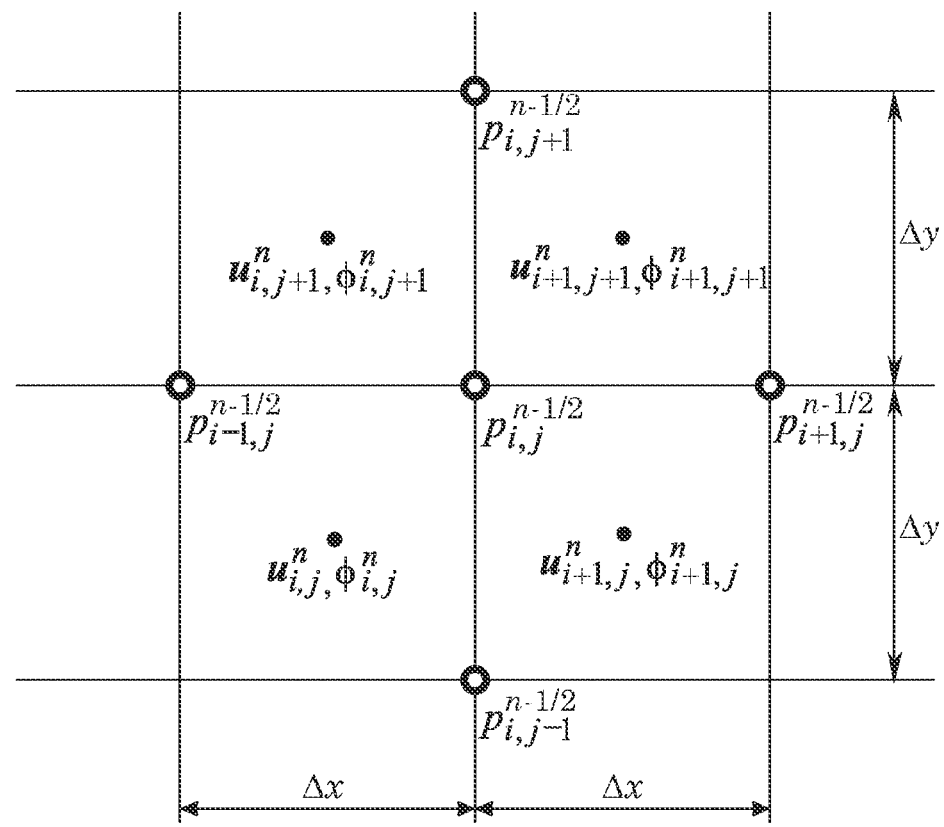
FIGS. 5A and 5B are illustrations of a computational grid and the spatial locations at which variables are calculated.
Figure 5B:
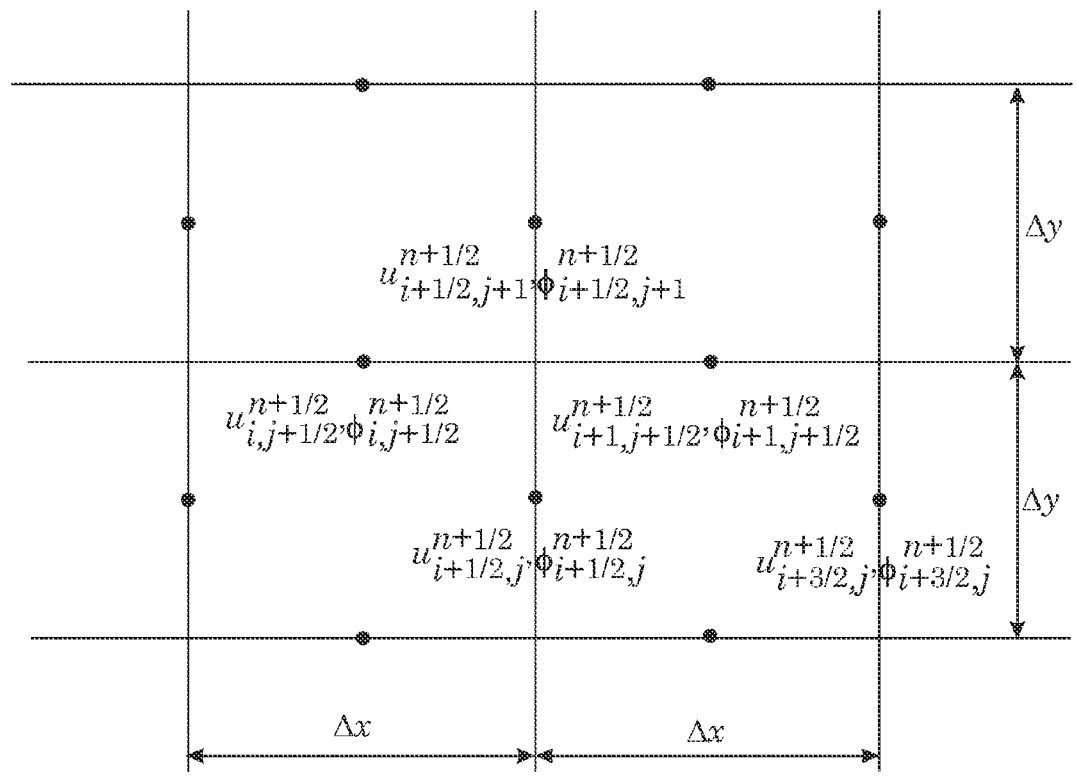

As illustrated in FIG. 5A, the velocities $\vec{u}_{i,j}^n$ and the level set $\phi_{i,j}^n$ are located at cell centers, and the pressure $p_{i,j}^{n-1/2}$ at grid points. The edge velocities $\vec{u}_{i+1/2,j}^{n+1/2}$ and edge level set $\phi_{i+1/2,j}^{n+1/2}$ are predictors. As illustrated in FIG. 5B, the predictors $\vec{u}_{i+1/2,j}^{n+1/2}$ and $\phi_{i+1/2,j}^{n+1/2}$ are at the middle point of the cell edges.

The Quadrilateral Grid

The transformation X=Φ(Ξ) maybe such that the grid in the computational space within the central area of each stage is composed of unit squares, $\Delta\xi=\Delta\eta=1$. An individual skilled in the art will appreciate how to adapt the present invention to a computational space that does not consist of unit squares. Ghost cells may be placed at the edges of each stage which may not be unit squares.

The coordinates of cell centers in the physical space X are described using equation (29).

$$\frac{1}{4}(X_{i-1,j-1} + X_{i-1,j} + X_{i,j-1} + X_{i,j}) \quad (29)$$

Differences between the grid points are used to define the elements of the transformation matrix T at cell centers, as described using equation (30).

$$(X_\xi)_{i,j} = \frac{1}{2}(X_{i,j} - X_{i-1,j} + X_{i,j-1} - X_{i-1,j-1}) \quad (30)$$

Note that only a local definition of the transformation (or mapping) is needed for an embodiment of the present invention. The existence or the exact form of the global transformation $X=\phi(\Xi)$ is not important and irrelevant in this work. The elements of the transformation matrix $T_{i,j}$ and the value of the Jacobian $J_{i,j}$ are calculated at the center of each cell and are stored in matrices in the code.

The Advection Terms in the Momentum and Level Set Equations

The algorithm for the advection terms in the momentum and level set equations maybe based on an un-split 2nd-order Godunov method, which is a cell-centered predictor-corrector method.

Equations (31) and (32) may be used to evaluate the advection terms in a corrector step of the predictor-corrector method.

$$[(\vec{u}\cdot\nabla)\vec{u}]_{i,j}^{n+1/2} = \left[\frac{(\vec{u}\cdot\nabla_\Xi)\vec{u}}{J}\right]_{i,j}^{n+1/2} \quad (31)$$

$$= \frac{1}{J_{i,j}}\left[\begin{array}{c}\frac{\bar{u}_{i+1/2,j}^{n+1/2} + \bar{u}_{i-1/2,j}^{n+1/2}}{2}\left(\vec{u}_{i+1/2,j}^{n+1/2} - \vec{u}_{i-1/2,j}^{n+1/2}\right) + \\ \frac{\bar{v}_{i,j+1/2}^{n+1/2} + \bar{v}_{i,j-1/2}^{n+1/2}}{2}\left(\vec{u}_{i,j+1/2}^{n+1/2} - \vec{u}_{i,j-1/2}^{n+1/2}\right)\end{array}\right]$$

$$[(\vec{u}\cdot\nabla)\phi]_{i,j}^{n+1/2} = \left[\frac{1}{J}(\vec{u}\cdot\nabla_\Xi)\phi\right]_{i,j}^{n+1/2} \quad (32)$$

$$= \frac{1}{J_{i,j}}\left[\begin{array}{c}\frac{\bar{u}_{i+1/2,j}^{n+1/2} + \bar{u}_{i-1/2,j}^{n+1/2}}{2}(\phi_{i+1/2,j}^{n+1/2} - \phi_{i-1/2,j}^{n+1/2}) + \\ \frac{\bar{v}_{i,j+1/2}^{n+1/2} + \bar{v}_{i,j-1/2}^{n+1/2}}{2}(\phi_{i,j+1/2}^{n+1/2} - \phi_{i,j-1/2}^{n+1/2})\end{array}\right]$$

The edge velocities and edge level sets used in equations (31) and (32) are obtained by Taylor's expansion in space and time. The time derivative of the velocity $\vec{u}_t^n$ and the time derivative of the level set function $\phi_t^n$ may be substituted with the momentum equations and the level set convection equation. Extrapolation may be performed from both sides of the edge and then Godunov type upwinding may be applied to decide which extrapolation to use. Equations (33)-(46) give detailed steps on how $\vec{u}_{i+1/2,j}^{n+1/2}$ may be obtained. The other time-centered edge values may be calculated using a similar method.

Equation (33) represents how the velocity on edge may be extrapolated from the left.

$$\vec{u}_{i+1/2,j}^{n+1/2,L} = \vec{u}_{i,j}^n + \frac{1}{2}\vec{u}_{\xi,i,j}^n + \frac{\Delta t}{2}\vec{u}_{t,i,j}^n \quad (33)$$

$$= \vec{u}_{i,j}^n + \left(\frac{1}{2} - \frac{\Delta t}{2J_{i,j}}\bar{u}_{i,j}^n\right)\vec{u}_{\xi,i,j}^n - \frac{\Delta t}{2J_{i,j}}(\vec{v}\vec{u}_\eta)_{i,j}^n + \frac{\Delta t}{2}F_{i,j}^n$$

Equation (34) represents how the intermediate matrix F may be calculated. The viscosity term is defined in equation (18). The surface tension term, $$-\frac{\delta(\phi)}{J^2\rho(\phi)Ca}\nabla_\Xi\cdot\left(T\frac{T^T\nabla_\Xi\phi}{|T^T\nabla_\Xi\phi|}\right)(T^T\nabla_\Xi\phi),$$

may be calculated in accordance with the third line of equation (17).

$$F_{i,j}^n = \left[-\frac{1}{\rho(\phi)J}T^T\nabla_\Xi p + (\text{Viscosity term}) + (\text{Surface tension})\right]_{i,j}^n \quad (34)$$

Equation (35) represents how the velocity may be extrapolated from the right.

$$\vec{u}_{i+1/2,j}^{n+1/2,R} = \vec{u}_{i+1,j}^n - \frac{1}{2}\vec{u}_{\xi,i+1,j}^n + \frac{\Delta t}{2}\vec{u}_{t,i+1,j}^n = \quad (35)$$

$$\vec{u}_{i+1,j}^n - \left(\frac{1}{2} + \frac{\Delta t}{2J_{i+1,j}}\bar{u}_{i+1,j}^n\right)\vec{u}_{\xi,i+1,j}^n - \frac{\Delta t}{2J_{i+1,j}}(\vec{v}\vec{u}_\eta)_{i+1,j}^n + \frac{\Delta t}{2}F_{i+1,j}^n$$

Monotonicity-limited central difference may be used for an evaluation of the normal slopes $\vec{u}_{\xi,i,j}^n$. The limiting is done on each component of the velocity separately. The transverse derivative term $(v\vec{u}_{72})_{i,j}^n$ may be evaluated by an upwind method.

The next thing is the Godunov upwinding to decide which extrapolated edge value to use. First calculate the transformed edge velocity by $\vec{\bar{u}}_{i+1/2,j}^{n+1/2} = (T\vec{u})_{i+1/2,j}^{n+1/2}$ and decide the advective velocity fluxes using the rules described by equations (36) and (37), in which $\psi\equiv\vec{u}$ or $\phi$.

$$\bar{u}_{i+1/2,j}^{n+1/2} = \begin{cases} \bar{u}_{i+1/2,j}^{n+1/2,L} & \text{if } \bar{u}_{i+1/2,j}^{n+1/2,L} > 0 \text{ and } \bar{u}_{i+1/2,j}^{n+1/2,L} + \bar{u}_{i+1/2,j}^{n+1/2,R} > 0 \\ \bar{u}_{i+1/2,j}^{n+1/2,R} & \text{if } \bar{u}_{i+1/2,j}^{n+1/2,R} < 0 \text{ and } \bar{u}_{i+1/2,j}^{n+1/2,L} + \bar{u}_{i+1/2,j}^{n+1/2,R} < 0 \\ 0 & \text{otherwise} \end{cases} \quad (36)$$

$$\psi_{i+1/2,j}^{n+1/2} = \begin{cases} \psi_{i+1/2,j}^{n+1/2,L} & \text{if } \bar{u}_{i+1/2,j}^{n+1/2} > 0 \\ \psi_{i+1/2,j}^{n+1/2,R} & \text{if } \bar{u}_{i+1/2,j}^{n+1/2} < 0 \\ \frac{\psi_{i+1/2,j}^{n+1/2,L} + \psi_{i+1/2,j}^{n+1/2,R}}{2} & \text{if } \bar{u}_{i+1/2,j}^{n+1/2} = 0 \end{cases} \quad (37)$$

The edge advection velocity fluxes are not necessarily divergence-free. An intermediate MAC projection may be used to make all the normal edge velocities divergence-free. Suppose q is a function which is smooth and $\vec{u}^e$ is the edge velocities obtained using equations (33)-(37). Thus, an equation (38) is formed that can divergence free.

$$\vec{u}^e - \frac{1}{\rho(\phi^n)} \nabla q \quad (38)$$

Taking the divergence of equation (38), yields equation (39).

$$\nabla \cdot \left( \frac{1}{\rho(\phi^n)} \nabla q \right) = \nabla \cdot \vec{u}^e \quad (39)$$

When the quadrilateral grids are taken into account equation (39) becomes equation (40).

$$\nabla_\Xi \cdot \vec{u}^e = \nabla_\Xi \cdot \left( \frac{1}{\rho(\phi^n) J} TT^T \nabla_\Xi q \right) \quad (40)$$

The boundary conditions for q may be defined as q=0 at the outflow and equation (41) at the inflow.

$$q = \Delta t (p^{BC}(t^{n+1/2}) - p^{BC}(t^{n-1/2})) \quad (41)$$

Once q has been solved, the edge advective velocities may be replaced using equation (42).

$$\vec{u}^e \leftarrow \vec{u}^e - \frac{1}{\rho(\phi^n) J} TT^T \nabla_\Xi q \quad (42)$$

The normal derivatives in (33) and (35) may be evaluated using the monotonicity-limited central difference method. The superscript $n$ is omitted in the following discussion to simplify the equations. The central, forward, and backward differences are first calculated using equations (43).

$$D_\xi^c (u)_{i,j} = (u_{i+1,j} - u_{i-1,j})/2,$$

$$D_\xi^+ (u)_{i,j} = (u_{i+1,j} - u_{i-1,j}),$$

$$D_\xi^- (u)_{i,j} = (u_{i+1,j} - u_{i-1,j}). \quad (43)$$

The differences from equations (43) may then be used to define a limiting slope as in equation (44).

$$\delta_{lim}(u)_{i,j} = \begin{cases} \min(2|D_\xi^-(u)_{i,j}|, 2|D_\xi^+(u)_{i,j}|) & \text{if } (D_\xi^-(u)_{i,j})(D_\xi^+(u)_{i,j}) > 0 \\ 0 & \text{otherwise} \end{cases} \quad (44)$$

A second-order limited slope is defined in equation (45).

$$(u_u)_{i,j} = \min(|D_\xi^c(u)_{i,j}|, \delta_{lim}(u)_{i,j}) \times \text{sign}(D_\xi^c(u)_{i,j}) \quad (45)$$

In the Taylor's extrapolation (33) and (35), the derivatives normal to the edge are computed using the monotonicity-limited central difference scheme. However, for the sake of stability, the tangential derivative may be computed using an upwind method. Equation (46) is an example of such an upwind method.

$$(\vec{v} \vec{u}_\eta)_{i,j}^n = \max(\vec{v}_{i,j}^n, 0)(\vec{u}_{i,j}^n - \vec{u}_{i,j-1}^n) + \min(\vec{v}_{i,j}^n, 0)(\vec{u}_{i,j+1}^n - \vec{u}_{i,j}^n) \quad (46)$$

The Viscosity Term

The viscosity term in equation (34) needs to be discretized. The viscosity term is defined in equation (18). The discretization of the first part of the viscosity term (18) may be done by using a central differencing approach for all the derivatives. The Laplacian term needs a little more attention. The Laplacian in the computational space may be described using equation (47).

$$\nabla_\Xi \cdot \left( \frac{TT^T \nabla_\Xi \vec{u}}{J} \right) = (\alpha \vec{u}_\xi)_\xi + (\beta \vec{u}_\xi)_\eta + (\beta \vec{u}_\eta)_\xi + (\gamma \vec{u}_\eta)_\eta \quad (47)$$

In which the coefficients used in equation (47) are listed in equation (48).

$$\alpha = \frac{(x_\eta^2 + y_\eta^2)}{J} \quad \beta = -\frac{(x_\xi x_\eta + y_\xi y_\eta)}{J} \quad \gamma = \frac{(x_\xi^2 + y_\xi^2)}{J} \quad (48)$$

Each term in equation (47) may be discretized using standard central differences with coefficients computed by averaging elements of the transformation matrix. For example the first term may be calculated using equation (49). An individual skilled in the art will appreciate how to adapt these equations to an alternative coordinate system.

$$[(\alpha \vec{u}_\xi)_\xi]_{i,j} = [\alpha \vec{u}_\xi]_{i+1/2,j} - [\alpha \vec{u}_\xi]_{i-1/2,j}$$
$$= \frac{\alpha_{i+1,j} + \alpha_{i,j}}{2} (\vec{u}_{i+1,j} - \vec{u}_{i,j}) - \frac{\alpha_{i,j} + \alpha_{i-1,j}}{2} (\vec{u}_{i,j} - \vec{u}_{i-1,j}) \quad (49)$$

At Stage Boundary

An embodiment of the present invention may include methods for calculating the values of system variables such as the velocity, pressure, and level set function at the stage boundaries.

Figure 6:
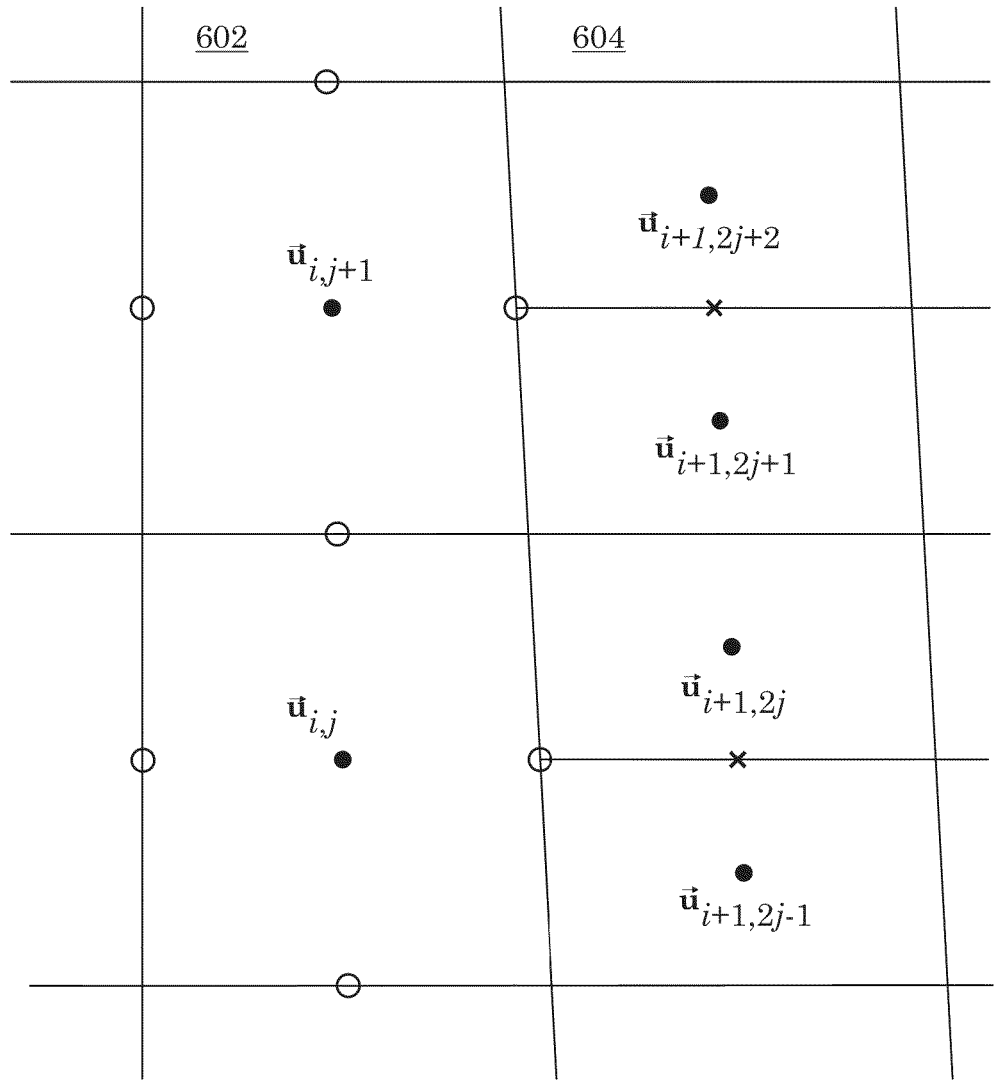
FIGS. 6, 7, and 9 are illustrations of a portion of first grid and a portion of a second grid.

For example when calculating the convection term at cell centers, one may first calculate the time-centered edge velocity vector, the advective velocity, and the level set value at the center of each edge in accordance with equations (31)-(42). FIG. 6 is an illustration of a portion of a first grid 602 and a portion of a second grid 604. The second grid 604 has a twice finer mesh than the first grid 602. The second grid 604 is also adjacent to the first grid 602. Edge centered values for the first grid 602 are shown as hollow circles.

The edge centered values within each grid may be calculated using the usual methods. The prior art does not provide guidance on how the edge centered values at border between the first gird 602 and the twice finer grid 604 should be calculated.

The applicant has invented a method for calculating the edge centered values at the border between the first grid 602 and the second grid 604. Obtaining the edge-center values (e.g. $u_{i+1/2,j}^{n+1/2}$ and $u_{i+1/2,j+1}^{n+1/2}$) between the two stages (602 and 604) requires an extrapolation from the left (i.e. from $u_{i,j}^n$, $u_{i,j+1}^n$) as well as from the right (i.e. from the locations marked with an "x" in FIG. 6). However, no velocity values are stored for those "x" locations. In an embodiment of the present invention, the velocity at the edge is calculated via an interpolation from the two closest cell center values. For example, to obtain the time-centered value $u_{i+1/2,j}^{n+1/2}$, a Taylor's extrapolation may be performed from the location $u_{i,j}^n$ on the left and from the "x" location at the right. The value of u″, v″ at that "x" are calculated by interpolating from $\vec{u}_{i+1,2j-1}''$ and $\vec{u}_{i+1,2j}''$. These values are than used in conjunction with equation (35) to extrapolate from the right. The Jacobian at "x" is calculated using the Jacobian of the cell above and the Jacobian of the cell below as described in equation (50). Note that the Jacobian at "x" is not a local average but a local SUM.

$$J_x = J_{i+1,2j-1} + J_{i+1,2j} \quad (50)$$

Note further that one cannot interpolate $J_{i+1,2j-1}$ and $J_{i+1,2j}$ to obtain $J_x$.

Figure 7:
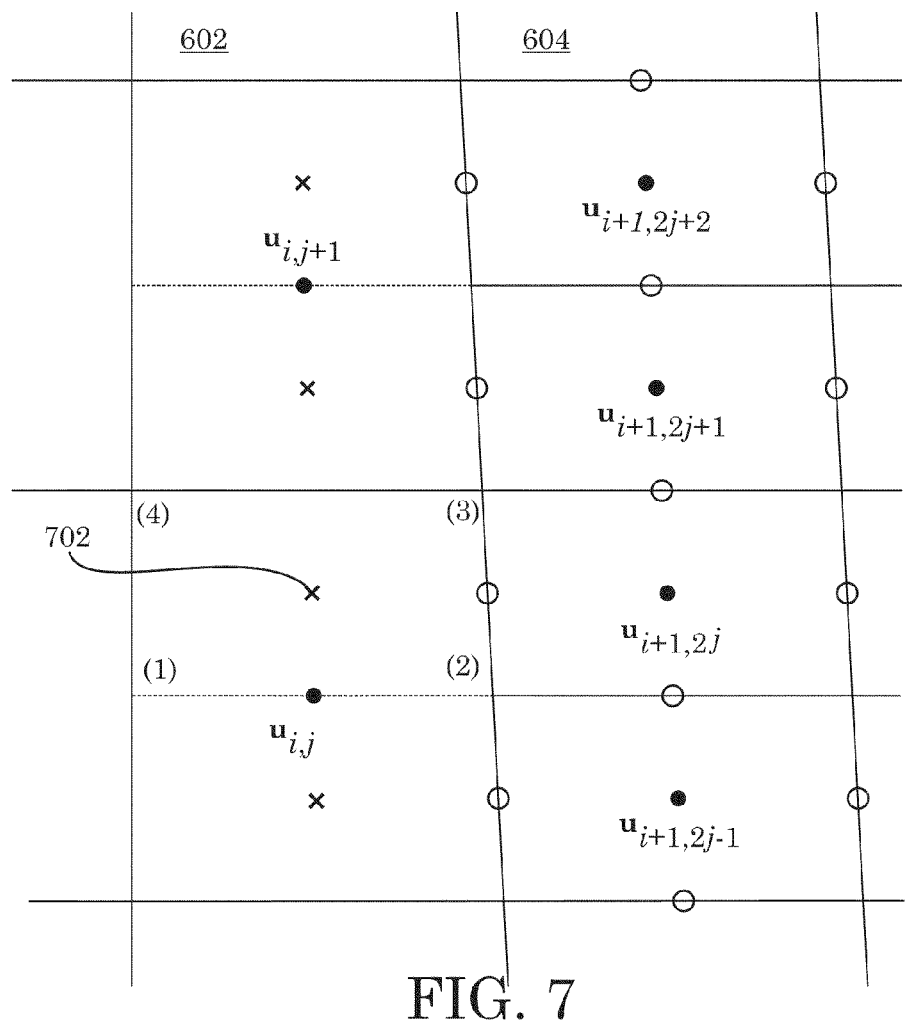

FIG. 7 is also an illustration of the first grid 602 and the second grid 604. In FIG. 7 the hollow circles identify edge centered values from the second grid 604. Evaluating the time-centered values at the hollow circles on the vertical edges separating the first grid 602 and the second grid 604 includes an extrapolation from the right and the left. The extrapolation from the right may be based upon the cell centered values (e.g., $\vec{u}_{i+1,2j}''$, $\vec{u}_{i+1,2j+1}''$) using equation (35). The extrapolation from the left (marked with an "x" in FIG. 7) is more complex. The value of u″, v″ at a point 702 marked with an "x" may be calculated by interpolating from $\vec{u}_{i,j}''$ and $\vec{u}_{i,j+1}''$. The Jacobian at "x" location 702 can be obtained by using the coordinates of nodes (1), (2), (3), and (4) relative to location 702. In which the coordinates of node (1) is defined by extending a grid line from the second grid 604 to the first grid 602 as shown in FIG. 7. This is an exemplary extrapolation; an individual skilled in the art will appreciate how to extrapolate this method to other points marked with an "x" in FIG. 7.

The evaluation of the monotonicity-limited central differences and the calculation of the viscosity term at cells next to the stage-to-stage boundary can be done similarly.

The Finite Element Projection

The finite element projection (27) is implemented differently in the interior of a stage than at the stage boundary.

Figure 8:
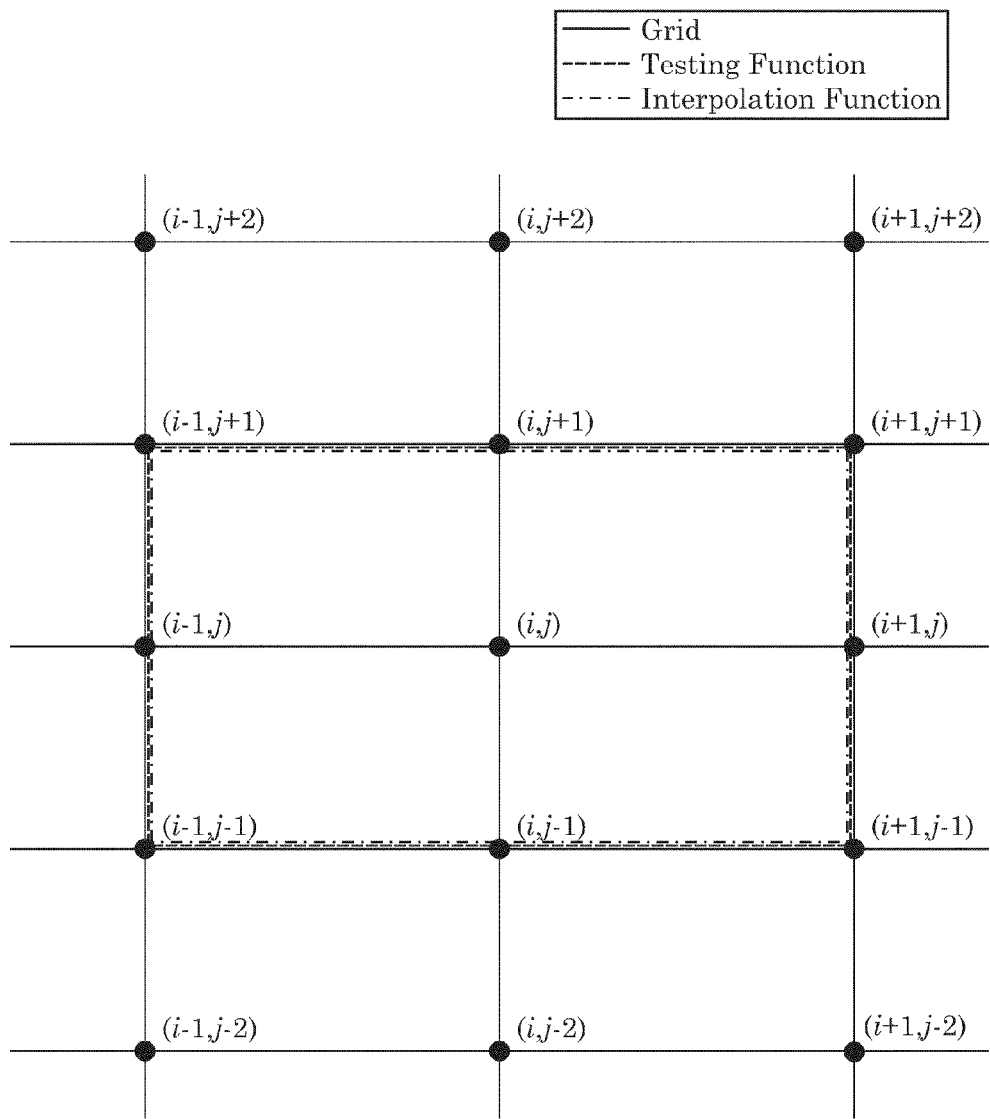
FIG. 8 is an illustration of an interior portion of a grid.

FIG. 8 is an illustration of the interior portion of a grid, such as first grid 602 or second grid 604. The gird is identified with solid black lines. FIG. 8 has been illustrated using the uniform spatial grid of computational space P for the sake of clarity. As shown in FIG. 8, the pressure is calculated at discrete points located at nodal points identified with black dots. The velocity predictors are calculated at cell centers.

Each node (i,j) has its own associated testing function $\psi_{i,j}$. The testing function $\psi_{i,j}$ extends through the area depicted by the dashed line (- -). The testing function may be bi-linear. The function value is one at node (i,j) and decreases bi-linearly toward the boundary of the dashed line, and is zero at the boundary. The interpolation (or shape) function for the pressure may be bi-linear. The interpolation function may extend through the area defined by dot dash line (_._._) which in the interior portion of the grid is identical to the range of the testing function. The velocity may be piecewise constant in each cell. The resulted algebraic equation at node (i,j) relates the pressure variable $p_{i,j}$ to its eight neighbors $p_{i+1,j}$, $p_{i-1,j}$, $p_{i,j-1}$, $p_{i,j+1}$, $p_{i+1,j-1}$, $p_{i+1,j+1}$, $p_{i-1,j-1}$, and $p_{i-1,j+1}$. If a single stage mesh is used, the resulting linear system for the projection equation is symmetric and sparse because the projection operator is self adjoint and the finite element is isoparametric (the testing function and the interpolation function are the same).

Figure 9:
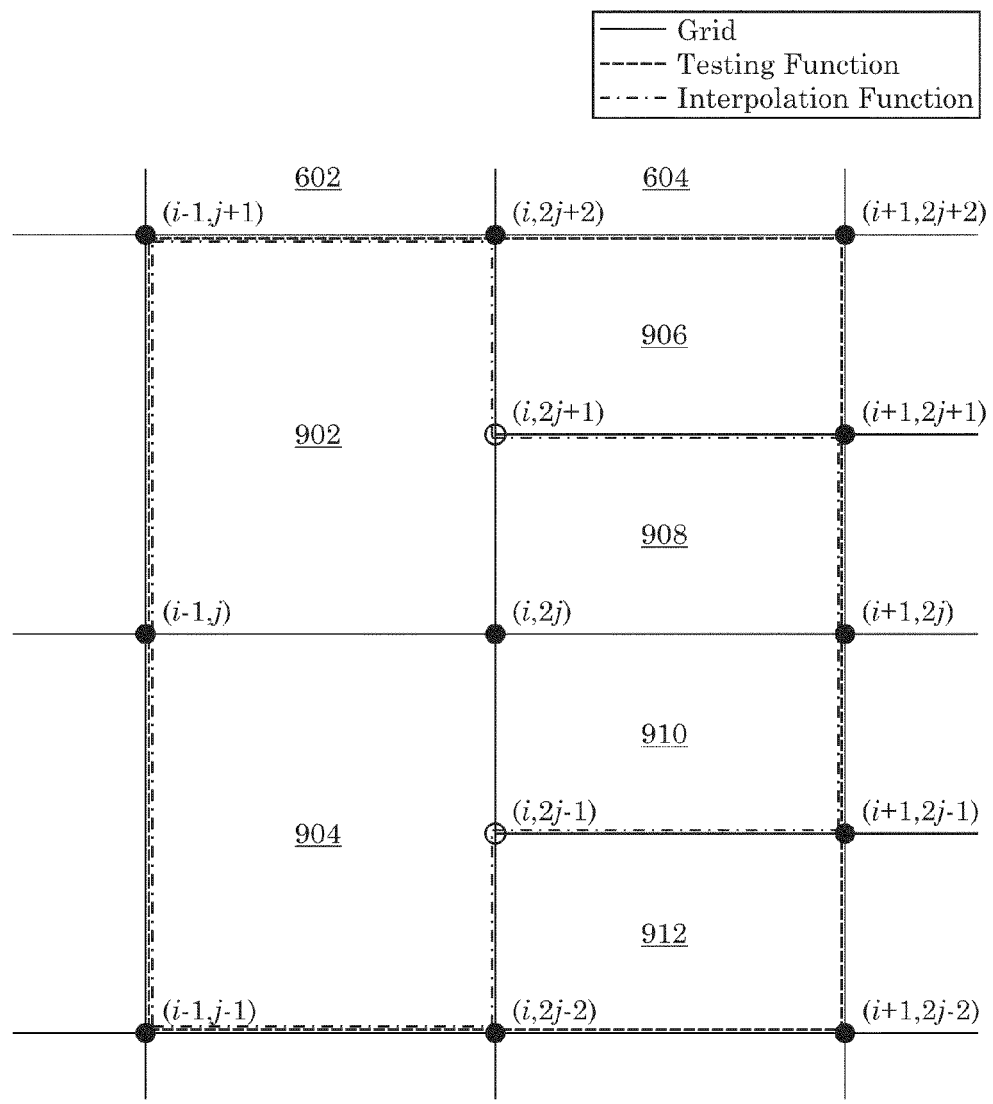
Figure 10:
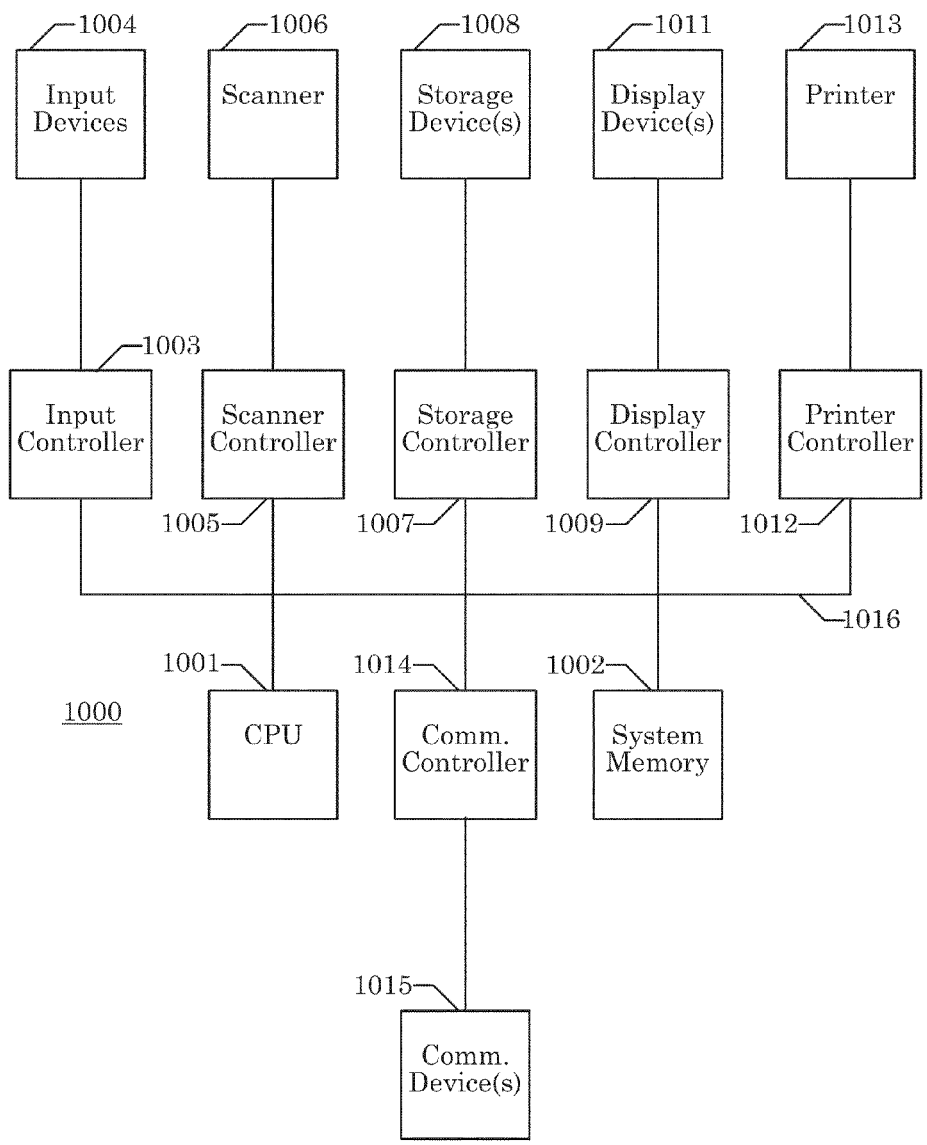
FIG. 10 is an illustration of a system on which an embodiment of the present invention may be implemented.

FIG. 9 is an illustration of the first grid 602 and the second grid 604. As in FIG. 8, FIG. 9 has been illustrated using the computational space Φ for the sake of clarity. The pressure is calculated at discrete points which are identified in FIG. 9 as nodal points and are identified with black dots. The discrete pressure variable may be calculated at all the nodes in the rougher stage 602, and at all the nodes in the finer stage 604 that do not belong to the stage-to-stage boundary. In an embodiment of the present invention, the pressure variable at locations marked by hollow circles in FIG. 9 is not directly solved from the finite element projection equation (27). The velocity predictors are located at cell centers of each cell in both the rougher and finer stages.

A testing function ψ is associated with each node. FIG. 9 is an illustration of a particular testing function $\psi_{i,2j}$ associated with a particular node (i,2j) on the stage-to-stage boundary. The testing function $\psi_{i,2j}$ extends through the area depicted by the dashed line (- -) (Cells 902, 904, 906, 908, 910, and 912). The testing function is bi-linear. The testing function is one at node (i,2j) and decreases toward the boundary of the dashed line, and is zero at the boundary.

The interpolation function for the pressure on the stage-to-stage boundary may extend through the area defined by dot dash line (_._._) (Cells 902, 904, 908, and 910) is shown in FIG. 9. As shown in FIG. 9 the range of the interpolation function is smaller than the testing function. The interpolation (or shape) function for the pressure at the stage-to-stage boundary is bi-linear. The interpolation function is piecewise continuous, but may include discontinuities at stage-to-stage boundary. The interpolation function $\phi_{i,2j}$ associated with node (i,2j) is one at node (i,2j) and decreases to zero at the boundary of the interpolation function. The interpolation function decreases in a different manner on the rough side 602 of the boundary from on the fine side 604 of the boundary. The pressure in cell 908 with nodes (i,2j), (i+1,2j), (i+1,2j+1), and (i,2j+1) on the fine side of the boundary may be calculated using equation (51).

$$p(x,y) = p_{i,2j}\phi_{i,2j}(x,y) + p_{i+1,2j}\phi_{i+1,2j}(x,y) + p_{i+1,2j+1}\phi_{i+1,2j+1}(x,y) + p_{i,2j+1}\phi_{i,2j+1}(x,y) \quad (51)$$

The pressure in the cell 906 with nodes (i,2j+1), (i+1,2j+1), (i+1,2j+2), and (i,2j+2) may be calculated using equation (52).

$$p(x,y) = p_{i,2j+1}\phi_{i,2j+1}(x,y) + p_{i+1,2j+1}\phi_{i+1,2j+1}(x,y) + p_{i+1,2j+2}\phi_{i+1,2j+2}(x,y) + p_{i,2j+2}\phi_{i,2j+2}(x,y) \quad (52)$$

Since a pressure value at the unique nodes like (i,2j+1) and (i,2j−1) is not solved directly, the pressure value $p_{i,2j+1}$ used in equations (51) and (52) may be obtained by interpolating between two or more pressure values such as $p_{i,2j}$ and $p_{i,2j+2}$. A linear interpolation function may be used to calculate the pressure at the unique nodes (i,2j+1) and (i,2j−1). Higher order interpolations may also be used without going beyond the scope and spirit of the present invention. The resulted algebraic equation at node (i,2j) relates the pressure variable $p_{i,2j}$ to its ten neighbors $p_{i+1,2j}$, $p_{i+1,2j+1}$, $p_{i+1,2j+2}$, $p_{i,2j+2}$, $p_{i-1,j+1}$, $p_{i-1,j}$, $p_{i-1,j-1}$, $p_{i,2j-2}$, $p_{i+1,2j-2}$ and $p_{i+1,2j-1}$. Since the testing function $\psi_{i,2j}$ associated with node (i,2j) is different from the interpolation function $\phi_{i,2j}$, the resulted linear system for the projection equation is not symmetric.

The present invention describes a method of performing a finite element projection in a system with a plurality of grids. In which there is a boundary separating a rough grid from a finer grid. The finer grid may be twice finer than the rougher grid. The grids may be quadrilateral. The finite element projection is done using a testing function and an interpolation function. The interpolation function for a particular node extends through the cells that intersect at the particular node. For quadrilateral grid there are four cells through which the interpolation function extends. The interpolation function may extend to the through the four closest cells that the interpolation function is associated with while the testing function extends through six nodes near the node it is at.

Thickness of the Interface

Because of the numerical difficulty caused by the Dirac delta function and by the sharp change of ρ and μ across the free surface, the Heaviside and Dirac delta functions are replaced by smoothed functions. The Heaviside function is redefined as $$H(\phi) = \begin{cases} 0 & \text{if } \phi < -\varepsilon \\ \frac{1}{2}\left(1 + \frac{\phi}{\varepsilon} + \frac{1}{\pi}\sin\left(\frac{\pi\phi}{\varepsilon}\right)\right) & \text{if } |\phi| \leq \varepsilon \\ 1 & \text{if } \phi > \varepsilon \end{cases} \quad (53)$$

Accordingly, the smoothed delta function is $$\delta(\phi) = \frac{dH(\phi)}{d\phi} \quad (54)$$

It is clear that the thickness of the interface is 2ε if the level set is a distance function.

In the numerical calculation, the parameter ε is chosen to be related to the mesh size $$\varepsilon = \frac{\alpha}{2}(\Delta x + \Delta y) \quad (55)$$

where α=1.5:2 in this work. The thickness of the interface reduces as the mesh is refined. Nonetheless, for any numerically practical choices, the interface will necessarily have some smearing.

Constraint on Time Step

Since the present time integration scheme is 2nd-order explicit for the convection term and semi-implicit for the viscosity term, the constraint on time step Δt is determined by the CFL condition, surface tension, viscosity, and total acceleration:

$$\Delta t < \quad (56)$$

$$\min_{i,j}\left[\frac{\Delta x}{|u|}, \frac{\Delta y}{|v|}, \sqrt{We\frac{\rho_1 + \rho_2}{8\pi}}\,h^{3/2}, \frac{1}{2}\frac{\rho^n}{\mu^n}\left(\frac{1}{\Delta x^2} + \frac{1}{\Delta y^2}\right)^{-1}, \sqrt{\frac{2h}{|F|}}\right]$$

where h=min (Δx,Δy) and F is defined in (34).

System

Having described the details of the invention, an exemplary system 1000, which may be used to implement one or more aspects of the present invention, will now be described with reference to FIG. 5. As illustrated in FIG. 5, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 5. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "computer-readable medium" as used herein includes software and or hardware having a program of instructions embodied thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution on a computer-readable medium. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A non-transitory computer-readable medium encoded with instructions for a processor to perform a method for simulating a system in a simulation space comprising:
    instructions for dividing the simulation space into a plurality of quadrilateral grids, including a first grid having a first number of meshes along a vertical axis of the simulation space, and a second grid adjacent to the first grid, the second grid having twice the first number of meshes along the vertical axis of the simulation space;
    instructions for identifying a first cell and a fourth cell in the first grid, and for identifying a second cell, a third cell, a fifth cell and a sixth cell in the second grid, wherein:
        a first node is located at an intersection of the first, third, fourth and fifth cell,
        a first segment defines a boundary between the first cell and the second cell and between the first cell and the third cell, and
        a second segment defines a boundary between the fourth cell and fifth cell and between the fourth cell and the sixth cell;
    instructions for evaluating, using a finite element projection, a system variable associated with the first node using a testing function extending through a first area encompassing: the first, second, third, fourth, fifth, and sixth cell; and an interpolation function extending through a second area encompassing the first, third, fourth and fifth cell.

2. The non-transitory computer-readable medium as recited in claim 1, wherein the system variable is selected from the group consisting of: a velocity of a fluid; a velocity of the fluid in a horizontal direction; a velocity of a fluid in a vertical direction; a level set function representative of a signed distance to an interface; and a pressure of the fluid.

3. The non-transitory computer-readable medium as recited in claim 1, wherein the instructions for evaluating the system variable includes instructions for evaluating a plurality of governing equations that represent the behavior of a fluid.

4. The non-transitory computer-readable medium as recited in claim 3, wherein the instructions for evaluating the plurality of governing equations includes instructions for finding a steady state solution to the governing equations.

5. The non-transitory computer-readable medium as recited in claim 3, wherein the plurality of governing equations represent the behavior of a first fluid bounded by a first surface, a second surface, and an interface between the first fluid and a second fluid.

6. The non-transitory computer-readable medium as recited in claim 5, wherein the first fluid is oil and the second fluid is air.

7. The non-transitory computer-readable medium as recited in claim 5, wherein the first surface is in motion.

8. The non-transitory computer-readable medium as recited in claim 5, wherein the second surface is in motion.

9. The non-transitory computer-readable medium as recited in claim 5, wherein the first surface has a first radius and the second surface has a second radius.

10. A non-transitory computer-readable medium encoded with instructions for a processor to perform a method for simulating a system in a simulation space comprising:
    instructions for dividing the simulation space into a plurality of quadrilateral grids, including a first grid having a first number of meshes along a vertical axis of the simulation space, and a second grid adjacent to the first grid, the second grid having twice the first number of meshes along the vertical axis of the simulation space;
    instructions for identifying a first cell in the first grid, and identifying a second cell and a third cell in the second grid,
    wherein a first segment defines a boundary between the first cell and the second cell and between the first cell and the third cell, the second cell and the third cell share a common boundary; and
    instructions for evaluating, using a numerical approximation method, a system variable at a second node located at the intersection of the first segment and the common boundary, which evaluation includes:
        evaluating the system variable at a third point located at a cell center of the first cell, at a fourth point located at a cell center of the second cell, and at a fifth point located at a cell center of the third cell, and
        evaluating a Jacobian located at a center of the common boundary as the sum of a Jacobian located at the fourth point and a Jacobian located at the fifth point.

11. The non-transitory computer-readable medium as recited in claim 10, wherein the system variable is selected from the group consisting of: a velocity of a fluid; a velocity of the fluid in a horizontal direction; a velocity of a fluid in a vertical direction; a level set function representative of a signed distance to an interface; and a pressure of the fluid.

12. The non-transitory computer-readable medium as recited in claim 10, wherein the instructions for evaluating the system variable includes instructions for evaluating a plurality of governing equations that represent the behavior of a fluid.

13. The non-transitory computer-readable medium as recited in claim 12, wherein the instructions for evaluating the plurality of governing equations includes instructions for finding a steady state solution to the governing equations.

14. The non-transitory computer-readable medium as recited in claim 12, wherein the plurality of governing equations represent the behavior of a first fluid bounded by a first surface, a second surface, and an interface between the first fluid and a second fluid.

15. The non-transitory computer-readable medium as recited in claim 14, wherein the first fluid is oil and the second fluid is air.

16. The non-transitory computer-readable medium as recited in claim 14, wherein the first surface is in motion.

17. The non-transitory computer-readable medium as recited in claim 14, wherein the second surface is in motion.

18. The non-transitory computer-readable medium as recited in claim 14, wherein the first surface has a first radius and the second surface has a second radius.

* * * * *